(12) United States Patent
Kongqiao et al.

(10) Patent No.: US 8,194,921 B2
(45) Date of Patent: Jun. 5, 2012

(54) METHOD, APPARTAUS AND COMPUTER PROGRAM PRODUCT FOR PROVIDING GESTURE ANALYSIS

(75) Inventors: Wang Kongqiao, Beijing (CN); Chai Xiujuan, Beijing (CN)

(73) Assignee: Nokia Corporation, Espoo (FI)

( * ) Notice: Subject to any disclaimer, the term of this patent is extended or adjusted under 35 U.S.C. 154(b) by 1013 days.

(21) Appl. No.: 12/147,643

(22) Filed: Jun. 27, 2008

(65) Prior Publication Data

US 2009/0324008 A1     Dec. 31, 2009

(51) Int. Cl.
*G06K 9/00*     (2006.01)
(52) U.S. Cl. ........................... 382/103; 715/863
(58) Field of Classification Search ................ 382/100, 382/103, 107, 162, 164, 165; 345/158; 715/863; 348/77
See application file for complete search history.

(56) References Cited

U.S. PATENT DOCUMENTS

| | | | |
|---|---|---|---|
| 5,594,469 A | 1/1997 | Freeman et al. | 345/158 |
| 6,970,579 B1 | 11/2005 | Thornton | 382/115 |
| 7,274,803 B1 | 9/2007 | Sharma et al. | 382/107 |
| 2002/0118880 A1* | 8/2002 | Liu et al. | 382/199 |
| 2004/0190776 A1 | 9/2004 | Higaki et al. | 382/190 |
| 2005/0238201 A1* | 10/2005 | Shamaie | 382/103 |
| 2006/0148323 A1 | 7/2006 | Canzler et al. | 439/631 |
| 2007/0098250 A1* | 5/2007 | Molgaard et al. | 382/154 |
| 2008/0019589 A1 | 1/2008 | Yoon et al. | 382/165 |

FOREIGN PATENT DOCUMENTS

WO    WO 2008/038096 A1    4/2008

OTHER PUBLICATIONS

Nielsen, E.S. et al., "Hand Gesture Recognition for Human-Machine Interaction", WSCG, 2004, pp. 395-402.
Bretzner L. et al., "Hand Gesture Recognition Using Multi-Scale Colour Features", *Hierarchical Models and Particle Filtering*, FGR'02, pp. 423-428, 2002.
Just, A. et al., "Hand Posture Classification and Recognition Using the Modified Census Transform", FGR'06, 2006, pp. 351-356.
Triesch, J. et al., "Robust Classification of Hand Postures Against Complex Backgrounds", FGR '96, 1996, pp. 170-175.
Han, J. et al., "Automatic Skin Segmentation for Gesture Recognition Combining Region and Support Vector machine Active Learning", *7th International Conference on Automatic Face and Gesture Recognition*, FGR 2006, Apr. 2-6, 2006, pp. 237-242.
International Search Report for PCT Application No. PCT/FI2009/050460, dated Oct. 7, 2009.

* cited by examiner

*Primary Examiner* — Andrew W Johns
(74) *Attorney, Agent, or Firm* — Alston & Bird LLP

(57) ABSTRACT

A method for providing gesture analysis may include analyzing image data using a skin detection model generated with respect to detecting skin of a specific user, tracking a portion of the image data correlating to a skin region, and performing a gesture recognition for the tracked portion of the image based on comparing features recognized in the skin region to stored features corresponding to a predefined gesture. An apparatus and computer program product corresponding to the method are also provided.

32 Claims, 9 Drawing Sheets

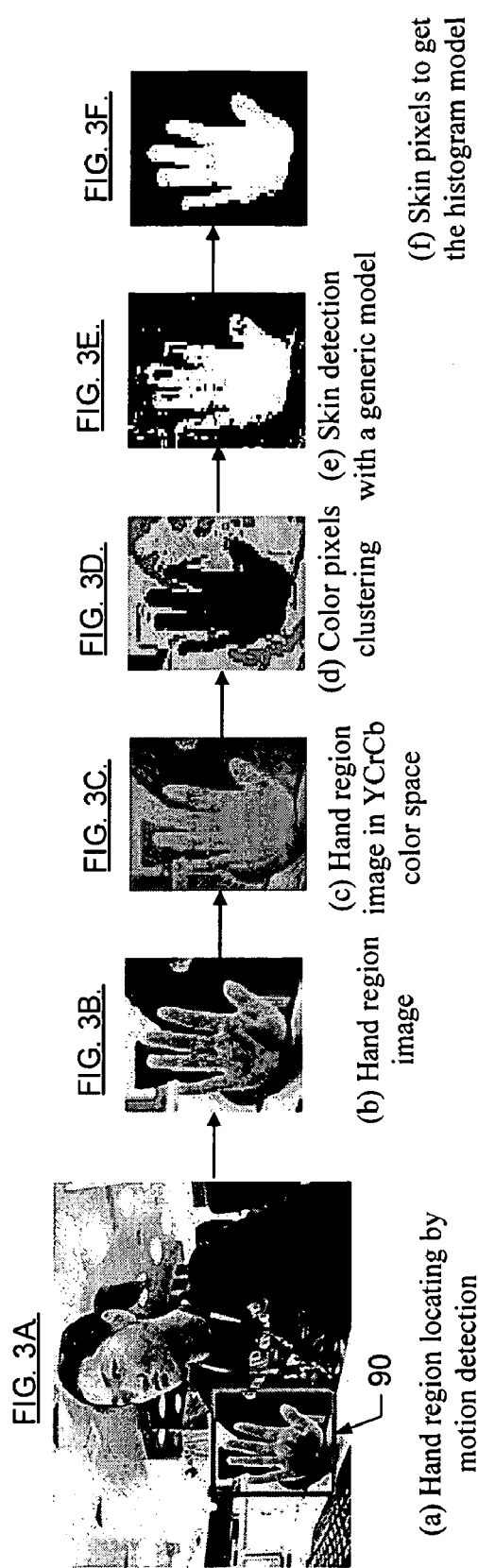

FIG. 4A.          FIG. 4B.          FIG. 4C.
| 9 | 6 | 3 |
|---|---|---|
| 3 | 5 | 5 |
| 14 | 4 | 2 |
(a)
Thresholding →
| 1 | 1 | 0 |
|---|---|---|
| 0 |   | 1 |
| 1 | 0 | 0 |
(b)
Convolution →
| $2^0$ | $2^1$ | $2^2$ |
|---|---|---|
| $2^7$ |   | $2^3$ |
| $2^6$ | $2^5$ | $2^4$ |
(c)
→ $LBP(c) = 75$
(d)
FIG. 5A. 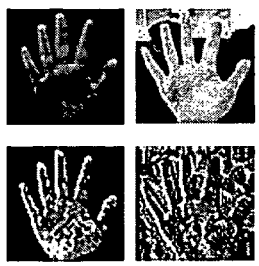  FIG. 5B. 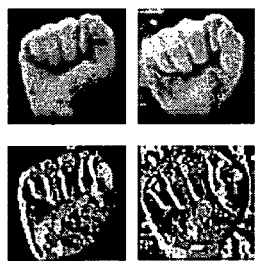  FIG. 5C. 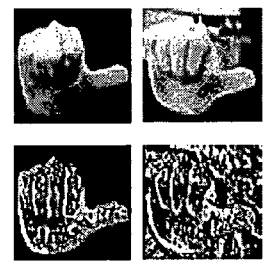
(a)               (b)               (c)

METHOD, APPARTAUS AND COMPUTER PROGRAM PRODUCT FOR PROVIDING GESTURE ANALYSIS

TECHNOLOGICAL FIELD

Embodiments of the present invention relate generally to user interface technology and, more particularly, relate to a method, apparatus and computer program product for providing gesture analysis for visual interaction systems.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to simplifying human to machine interfaces for HCI (human-computer interaction). With recent developments in the area of the computing devices and hand-held or mobile devices improving the capabilities of such devices, next generation HCI is on the minds of many. Furthermore, given that the devices will tend to increase in their capacity to create content, store content and/or receive content relatively quickly upon request, and given also that mobile electronic devices such as mobile phones often face limitations in display size, text input speed, and physical embodiments of user interfaces (UI), challenges are often created in the context of HCI.

Furthermore, improvements in HCI may also enhance user enjoyment and open possibilities for user interface with computing devices in environments that may otherwise have presented changes for effective HCI. One such improvement relates to gesture recognition. Compared with other interactive mechanisms currently employed in HCI such as, for example, keypad and mouse, some may consider gesture recognition to improve the naturalness and facility of communication. As such, certain applications have been developed to enable gesture recognition for use as a command controller in digital home appliances, for use in file/web navigation or for use as a substitute for the commonly used remote controller. However, current mechanisms for gesture analysis are often slow or cumbersome to employ. Given the general utility of next generation HCI, improvements in gesture analysis may be desirable.

BRIEF SUMMARY OF SOME EXAMPLES OF THE INVENTION

A method, apparatus and computer program product are therefore provided to enable the use of gesture analysis in, for example, a visual interaction system. In some embodiments, a user specific skin model may be employed and/or a "trigger" gesture may be detected to initiate hand tracking and/or gesture analysis. As such, some exemplary embodiments of the invention may provide for relatively robust and fast gesture analysis.

In an exemplary embodiment, a method of providing gesture analysis is provided. The method may include analyzing image data using a skin detection model generated with respect to detecting skin of a specific user, tracking a portion of the image data correlating to a skin region, and performing a gesture recognition for the tracked portion of the image based on comparing features recognized in the skin region to stored features corresponding to a predefined gesture.

In another exemplary embodiment, a computer program product for providing gesture analysis is provided. The computer program product includes at least one computer-readable storage medium having computer-executable program code portions stored therein. The computer-executable program code portions may include first, second and third program code portions. The first program code portion is for analyzing image data using a skin detection model generated with respect to detecting skin of a specific user. The second program code portion is for tracking a portion of the image data correlating to a skin region. The third program code portion is for performing gesture recognition for the tracked portion of the image based on comparing features recognized in the skin region to stored features corresponding to a predefined gesture.

In another exemplary embodiment, an apparatus for providing gesture analysis is provided. The apparatus may include a processor. The processor may be configured to analyze image data using a skin detection model generated with respect to detecting skin of a specific user, track a portion of the image data correlating to a skin region, and perform a gesture recognition for the tracked portion of the image based on comparing features recognized in the skin region to stored features corresponding to a predefined gesture.

In yet another exemplary embodiment, an apparatus for providing gesture analysis is provided. The apparatus may include means for analyzing image data using a skin detection model generated with respect to detecting skin of a specific user, means for tracking a portion of the image data correlating to a skin region, and means for performing a gesture recognition for the tracked portion of the image based on comparing features recognized in the skin region to stored features corresponding to a predefined gesture.

Embodiments of the invention may provide a method, apparatus and computer program product for employment, for example, in mobile or fixed environments. As a result, for example, computing device users may enjoy an improved capability for interaction with their respective computing devices.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

FIGS. 3A-3F illustrates stages in a process of histogram model determination according to an exemplary embodiment of the present invention;

FIGS. 4A-4C illustrates a local binary pattern according an exemplary embodiment of the present invention;

FIGS. 5A-5C illustrates local binary pattern filtered images for different hand gestures according to an exemplary embodiment of the present invention;

DETAILED DESCRIPTION OF SOME EMBODIMENTS OF THE INVENTION

Figure 1:
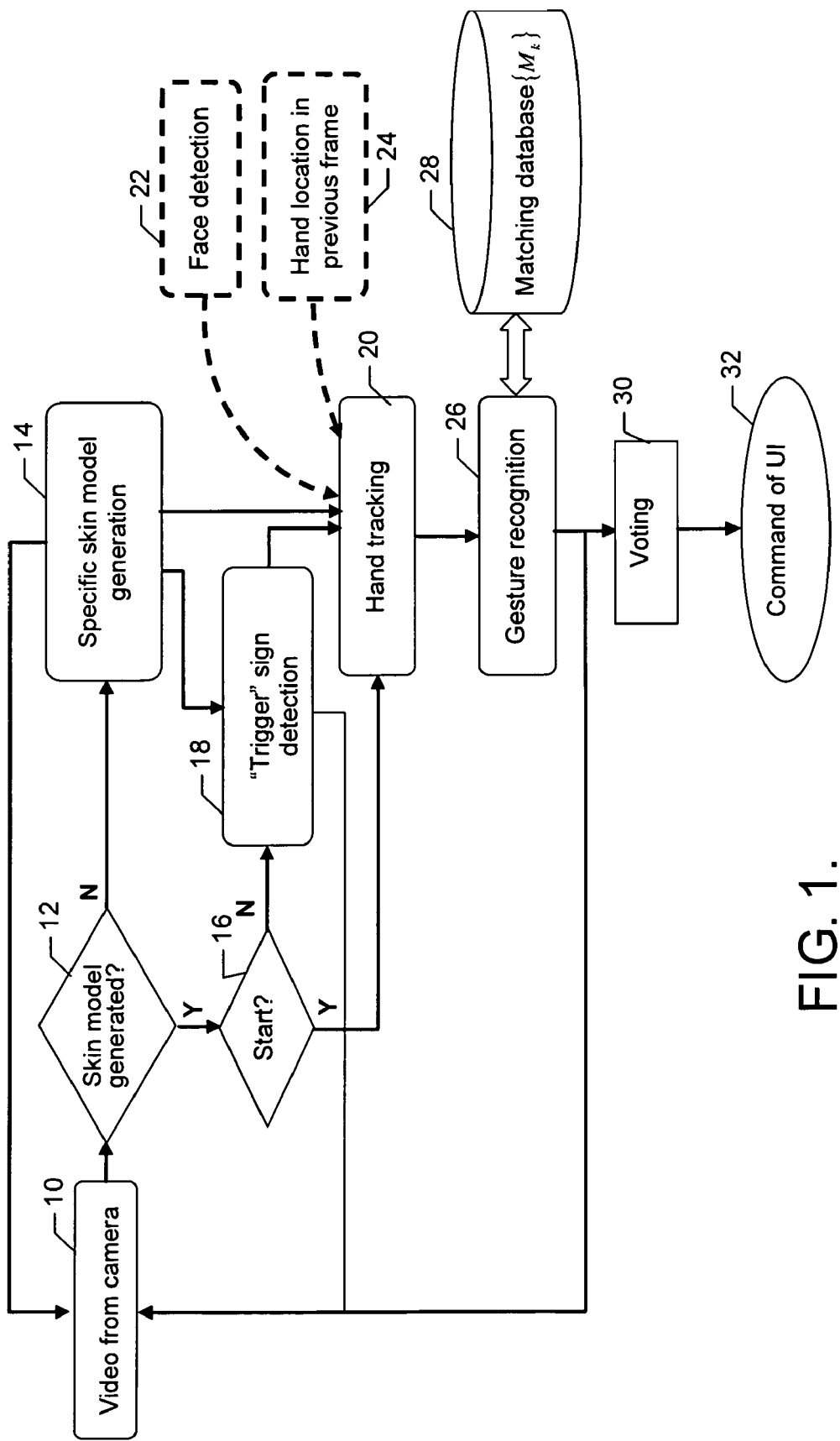
FIG. 1 illustrates one example of a gesture analysis process for a UI controller according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Some embodiments of the present invention may provide a mechanism by which improvements may be experienced in relation to gesture analysis. In this regard, for example, some embodiments may provide for a real-time gesture analysis scheme, which may be suitable for interactive activities on hand-held or other computing devices. Thus, a user may be enabled to control a device (e.g., the hand-held or computing device of the user or even a remote device) by gesture rather than operating the device manually. Some exemplary embodiments may provide automatic gesture analysis via a scheme that integrates various components such as, for example, specific skin model generating, detection of a trigger gesture, hand tracking and gesture recognition. Hand tracking, according to some embodiments of the present invention, may provide relatively accurate hand location with a relatively low sensitivity to background, illumination, hand scale variation and movement, etc.

In some embodiments, as indicated above, a skin model may be generated for a specific person based on hand movement detection and a generic Gaussian mixture model (GMM) skin model constraint. The specific skin model generated may be represented by a color histogram, for example, in CbCr space, which is a color space used in digital photography in reference to blue chroma (Cb) and red chroma (Cr) components. In some cases, a specific gesture may be detected as a trigger command after which time hand location may be initialized and hand tracking and gesture recognition may be performed on frames of subsequent video sequences.

Hand tracking may be realized, in an exemplary embodiment, by a detection-based strategy. In this regard, for example, hand location in each frame may be determined based on skin detection and multiple useful cues, such as face detection, hand location information in a previous frame or the like. Detection based tracking according to some embodiments may provide relatively accurate and fast tracking that may be used in relation to real-time applications. A particular portion of a frame defining a hand region that may be determined by hand tracking may be used as a basis for a patch-based local texture descriptor. The descriptor may be used to represent multiple gesture regions and robust gesture recognition results may be achieved through matching a current texture descriptor with gallery samples. Results from several consecutive frames may be integrated by implementing a voting strategy to give a final gesture classification, which may control a visual interaction system to perform a corresponding operation according to an associated predefined command.

FIG. 1 illustrates one example of a gesture analysis process for a UI controller according to an exemplary embodiment of the present invention. It should be noted that while an exemplary embodiment will be described below in the context of skin detection based gesture analysis for a hand, other portions of exposed skin may also be included with respect to gesture analysis. For example, arm positioning, foot positioning or the like may also be considered with respect to gesture analysis assuming the arms, feet, etc., are exposed for enabling skin detection. As shown in FIG. 1, which is a flow diagram showing various operations that may be conducted in association with an exemplary embodiment, image data (e.g., video data) may initially be received at operation 10. The image data may be received from a camera associated with a device performing gesture recognition according to an exemplary embodiment insofar as the camera may be a part of the device or in communication with the device. In some embodiments, communication between the camera and other components used in gesture analysis may be real-time or at least with relatively little delay.

According to the exemplary embodiment of FIG. 1, a determination may be made at operation 12 with respect to whether a skin model has been generated for a person in the image data that is being monitored with respect to gesture analysis. The image data may be analyzed to provide a specific skin model for the person at operation 14 if there is not an existing model for the person. If there is an existing model (or after such a model has been developed), a determination may be made at operation 16 in relation to whether tracking (e.g., hand tracking) is to be commenced in relation to the detection of a "trigger" sign or gesture. A trigger gesture may be a sign or gesture which, when detected, initiates tracking of a particular skin exposed region and analysis of the region with respect to gesture recognition. Detection of the trigger gesture may be performed at operation 18. Responsive to trigger gesture detection, tracking of an exposed skin region (e.g. hand tracking) may be initiated at operation 20. However, in some situations, the trigger gesture may not be utilized to initiate hand tracking and some other stimuli may initiate hand tracking such as, for example, a manual user initiation instruction or a different automatic or manual trigger.

In order to enable tracking of a particular skin region (e.g., the hand) other exposed skin regions may be detected and excluded from the analysis. Thus, for example, since the face is often exposed and may appear in the same image frame as the hand, face detection may be performed at operation 22 for use in association with hand tracking. Another technique that may assist in hand tracking may include considering a position of the hand in a previous frame with respect to determining a hand region in a current frame at operation 24.

By tracking motion or changes with respect to features that may be extracted from the exposed skin region being tracked (e.g., a hand region), gesture analysis may be performed at operation 26. In an exemplary embodiment, gesture analysis may be performed by comparing features from the exposed skin region being tracked to features in a stored database of features that correspond to specific gestures. By determining a match (or substantial similarity to within a threshold amount) between features in the database (e.g., a matching database 28) and the features extracted from the exposed skin region being tracked, a gesture corresponding to the specific gesture associated with the matched features from the database may be recognized.

Although not required, in some embodiments, a "voting" strategy may be employed at operation 30. The voting strategy may be employed by providing a counter to determine the number of times or frames for which a particular gesture appears (although a time based approach could also be employed). If a particular gesture is recognized for a threshold number of times or frames consecutively or within a given period of time, the particular gesture may pass the vote test, and may be considered as a recognized gesture. However, if a gesture is only recognized for a period of time or number of frames that is below the threshold, the gesture may not be considered to be recognized. The voting strategy may be useful in eliminating unintended gestures that may occur during a transition between intended gestures.

If a particular gesture is recognized (or, if voting is used, after the particular gesture passes the vote test), a corresponding command may be executed at operation 32. As such, for example, a database may store information associating gestures with respective commands or UI functions. Thus, for example, if a clenched fist is recognized while playing music or video content and the clenched fist is associated with a stop command, the music or video content being rendered by be stopped.

Figure 2:
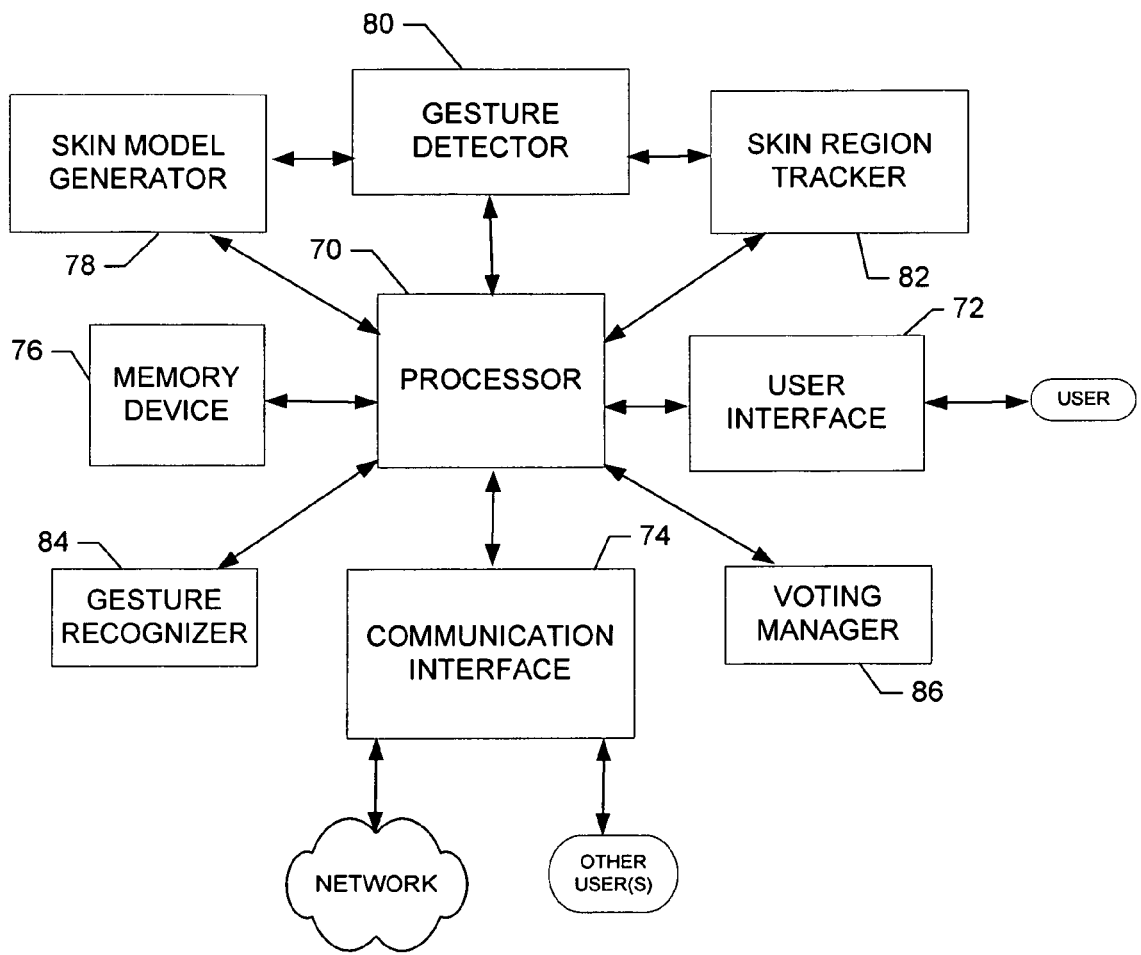
FIG. 2 illustrates a schematic block diagram of an apparatus for enabling gesture analysis according to an exemplary embodiment of the present invention.

FIG. 2 illustrates a schematic block diagram of an apparatus for enabling gesture analysis according to an exemplary embodiment of the present invention. An exemplary embodiment of the invention will now be described with reference to FIG. 2, in which certain elements of an apparatus for enabling gesture analysis are displayed. The apparatus of FIG. 2 may be employed, for example, on a mobile terminal (e.g., the mobile terminal 110 of FIG. 9) or a variety of other devices, both mobile and fixed (such as, for example, a network device, personal computer, laptop computer, or the like). Alternatively, embodiments may be employed on a combination of devices. Accordingly, some embodiments of the present invention may be embodied wholly at a single device (e.g., the mobile terminal 110) or by devices in a client/server relationship. Furthermore, it should be noted that the devices or elements described below may not be mandatory and thus some may be omitted in certain embodiments.

Referring now to FIG. 2, an apparatus for enabling gesture analysis is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal (e.g., the mobile terminal 110), the user interface 72 may include, among other devices or elements, any or all of a speaker, a microphone, a display, and a keyboard or the like.

In an exemplary embodiment, the processor 70 may be embodied as, include or otherwise control a skin model generator 78, a gesture detector 80, a skin region tracker 82 (e.g., a hand region tracker), and a gesture recognizer 84. In some embodiments, the processor 70 may also be embodied as, include or control a voting manager 86. The skin model generator 78, the gesture detector 80, the skin region tracker 82, the gesture recognizer 84 and the voting manager 86 may each be any means such as a device or circuitry embodied in hardware, software or a combination of hardware and software (e.g., processor 70 operating under software control) that is configured to perform the corresponding functions of the skin model generator 78, the gesture detector 80, the skin region tracker 82, the gesture recognizer 84 and the voting manager 86, respectively, as described below. In an exemplary embodiment, the skin model generator 78, the gesture detector 80 and/or the skin region tracker 82 may each be in communication with a media capturing module (e.g., the camera module 137 of FIG. 9) to receive image data for use in analysis as described below.

The skin model generator 78 may be configured to generate a user specific skin model. In this regard, since embodiments of the present invention employ skin detection for operation, and since many different skin tones may be encountered among different potential users, a user specific skin model may provide improved performance over use with different users for a generic skin model. Furthermore, a user specific skin model may also provide improved performance for use with only a single user, since the skin model may be better tailored to the single user than a generic skin model. Accordingly, a user specific skin model may account for variations of illuminations and races among other distinguishing factors that may differentiate skin features of different users.

In an exemplary embodiment, the skin model generator 78 may be configured to initially detect a region of interest (e.g., a hand region) that is likely to be an area in which gestures may be recognized. In some embodiments, the region of interest may be detected based at least in part on motion. For example, if hand gestures are to be detected, motion caused by the hand may be a dominant motion in some sequential frames. The hand motion may be defined as a regular right and/or left swing. Then, the hand region may be located by using a temporary-difference and morphological operators, such as dilation and erosion, etc. FIG. 3A shows an example of location of a hand region 90 as an exemplary region of interest.

The skin model generator 78 may be further configured to perform a color cluster for pixels in the hand region 90. In this regard, as shown in FIG. 3B, the hand region 90 may be transformed into YCrCb color space, which is given in FIG. 3C. YCrCb color space is one of a family of color spaces used in video and digital photography systems in which Y is luminance and Cb and Cr are the blue and red chroma components, respectively. After transformation into YCrCb color space, the pixels may be clustered into several main color distributions (e.g., a 3-cluster). Because the hand is the most dominant object in the hand region 90, the clustered distributions may include one skin cluster. An example of a result of color clustering for the hand region 90 is shown in FIG. 3D.

In addition to color clustering, the skin model generator may be configured to determine a skin color cluster by using a generic skin model constraint. Although pixels may be clustered into several classes, a determination may be made with respect to which cluster corresponds to skin pixels. Accordingly, in an exemplary embodiment, a generic skin model may be used to realize coarse skin detection for the hand region. Through integrating the coarse skin detection and color clustering results, the skin cluster may be determined by counting the skin pixel numbers for each cluster. Coarse skin detection results according to one example are given in FIG. 3E.

A largest connected region within the skin cluster may then be determined. For example, the largest connected region for skin cluster pixels may be obtained in order to eliminate noise pixels, which may be obvious non-hand pixels that could introduce statistical errors. FIG. 3F presents an example of the final skin pixels determined according to one exemplary embodiment that may then be used in skin model generation.

Specific skin model generation may be accomplished at this point since the skin pixels may be relatively well defined. In an exemplary embodiment, the skin model may be generated by a color histogram model. Considering the insensitivity to illumination variations, statistical information may be generated in YCrCb space and only the hue subspaces (Cr and Cb) may be selected. Formally, the color histogram H may be computed according to Eq. (1):

$$H_i = \sum_{(x,y)} C\{f(x, y) = i\}/n, (i = 0, 1, \ldots, K), \quad (1)$$

where $f(x,y) = (Cr(x,y)/bin)*bin + Cb(x,y)/bin$, $$K = \max_{(x,y)}(f(x, y)),$$

bin is the category number classified for each color level (experientially, it is set to 16), n is the total number of the pixels in the hand region and C is a counting function, which is defined as:

$$C\{f\} = \begin{cases} 1, & f \text{ is true} \\ 0, & f \text{ is false.} \end{cases} \quad (2)$$

At the same time (or another time), a statistical non-skin color histogram H may be determined, which may also be used in skin detection for reducing errors.

The gesture detector 80 may be configured to perform gesture detection. In this regard, one exemplary function that may be performed by the gesture detector 80 may include detection of a trigger gesture. In this regard, in some embodiments, after the specific skin model is generated by the skin model generator 78, the gesture analysis procedure may be initiated to enable detection of a trigger gesture. Trigger gesture detection may be performed on a frame by frame basis and, when the trigger gesture is detected, may initiate hand tracking and gesture recognition in some embodiments.

In an exemplary embodiment, the trigger gesture may be defined by the user in, for example, a training phase. As such, the user may present a particular gesture to a user specific skin model trained for recognizing the user's skin and the user may inform the gesture detector 80 (e.g., via the user interface 72) that the particular gesture is the trigger gesture. In an exemplary embodiment, while training the gesture detector 80, the user may desire to ensure that the hand region is the dominant skin region in each frame, except perhaps the face, which may be removed or ignored. In this regard, in many cases, a face and hand may appear in the same image frame. Thus, the gesture detector 80 may be further configured to not only detect a face region, but to neglect the face region after utilizing a face detection technique for identification of the face region. After the face region is neglected, a dominant or maximal connected region of skin pixels may be found and regarded as corresponding to the hand. If the gesture currently presented on the hand is identified to be the trigger gesture, then the hand may be located accurately for subsequent gesture analysis processing. Features corresponding to the gesture may be stored such that, in the future, if features in an image are recognized to correspond to the trigger gesture, a functionality associated with the trigger gesture (e.g., initiating hand tracking and gesture recognition) may be accomplished and a UI control system may be started accordingly.

In an exemplary embodiment, the gesture detector 80 may be configured not only for recognition of the trigger gesture but also for recognition of other gestures after a tracking and recognition sequence has begun. In this regard, for example, a plurality of gestures may each be associated with a respective UI command. In some cases, a patch-based local texture description may be utilized in connection with gesture detection in order to improve accuracy and robustness of a recognition algorithm used for the gesture detection. A patch-based local texture description may be utilized to provide a relatively invariant feature description of an image (or portion of an image). As such, to provide a relatively good representation of a hand image, a local binary pattern (LBP) transformation may be utilized by the gesture detector 80. An exemplary LBP is shown in FIG. 4 and described below.

In this regard, for each pixel $c(x_c,y_c)$ in the image, a label may be applied by a binary string, which may be obtained by thresholding neighboring pixels (e.g., the 8-neighborhood pixels) $p(x_p,y_p)$ with $c(x_c,y_c)$, as Eq. (3) shows and FIGS. 4A and 4B demonstrate:

$$s(p, c) = \begin{cases} 1, & f_p \geq f_c \\ 0, & f_p < f_c. \end{cases} \quad (3)$$

where, f denotes the corresponding gray value of pixel.

For the binary string, performing a convolution with a transform coefficients matrix (e.g., such as the matrix of FIG. 4C), the final decimal value corresponding to pixel $c(x_c,y_c)$ may be computed according to Eq. (4):

$$LBP(c) = \sum_{i=0}^{7} s(p_i, c) \cdot 2^i. \quad (4)$$

Some LBP filtered images for different hand gestures are illustrated in FIG. 5 by way of example. In this regard, for each of the figures (e.g., FIGS. 5A, 5B and 5C) the top two images represent hand images of different gestures under a uniform black background (top and leftmost image as viewed on the page) and a complex background (top and rightmost image as viewed on the page), and the bottom two images show the corresponding LBP filtered images for each respective image on the top row. From the images of FIG. 5, it may be appreciated that the LBP operator can extract many image details. Furthermore, although a complex background may affects transform results, the similarity within one gesture class may still remain relatively high.

Figure 6:
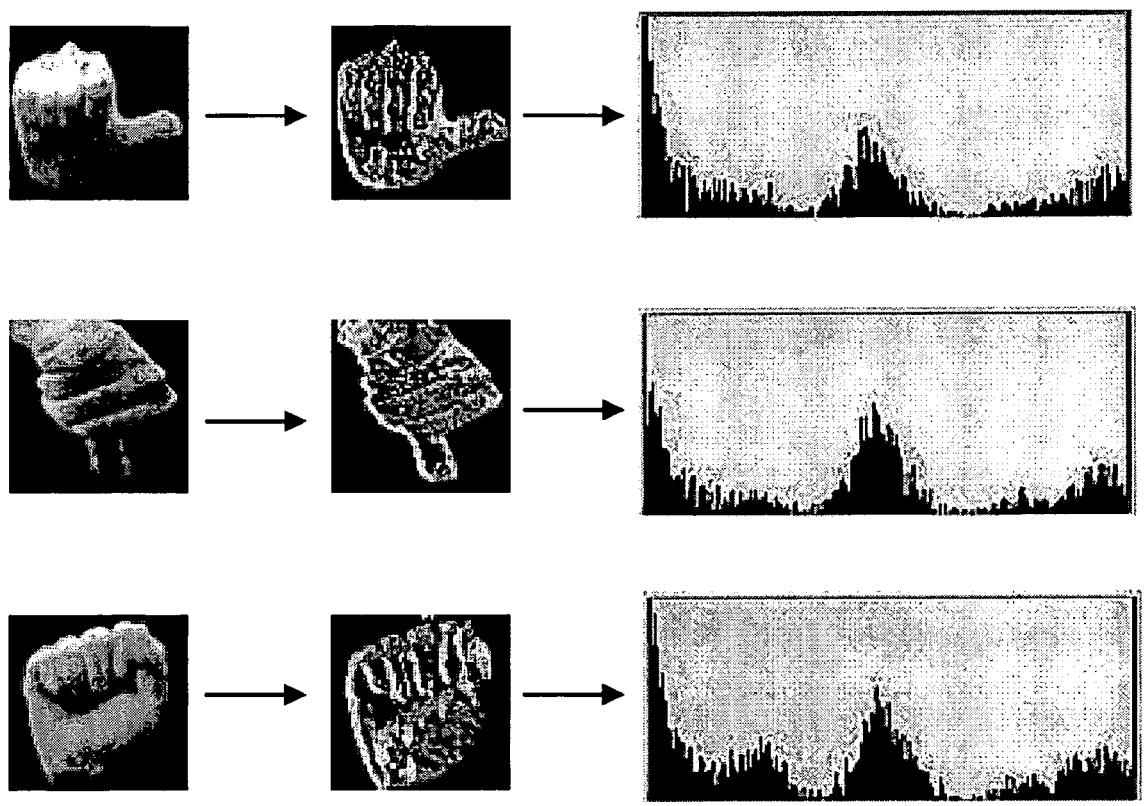
FIG. 6 illustrates several examples of histograms corresponding to respective images of gestures according to an exemplary embodiment of the present invention.

The LBP filtered image may represent a gray-level LBP texture description. A histogram of the LBP filtered image may then be used as a feature vector by counting the number of appearances of each gray-level pixel. However, by using a histogram, some spatial structure information may be lost, which may introduce matching difficulties in some instances. For example, as shown in FIG. 6, which illustrates several examples of histograms corresponding to respective images of gestures, the top two gestures involving an extended thumb with different spatial orientations may be difficult to distinguish. Accordingly, in order to maintain spatial structure relationships for feature vectors of each gesture image, the patch-based strategy may be applied by the gesture detector 80.

Figure 7:
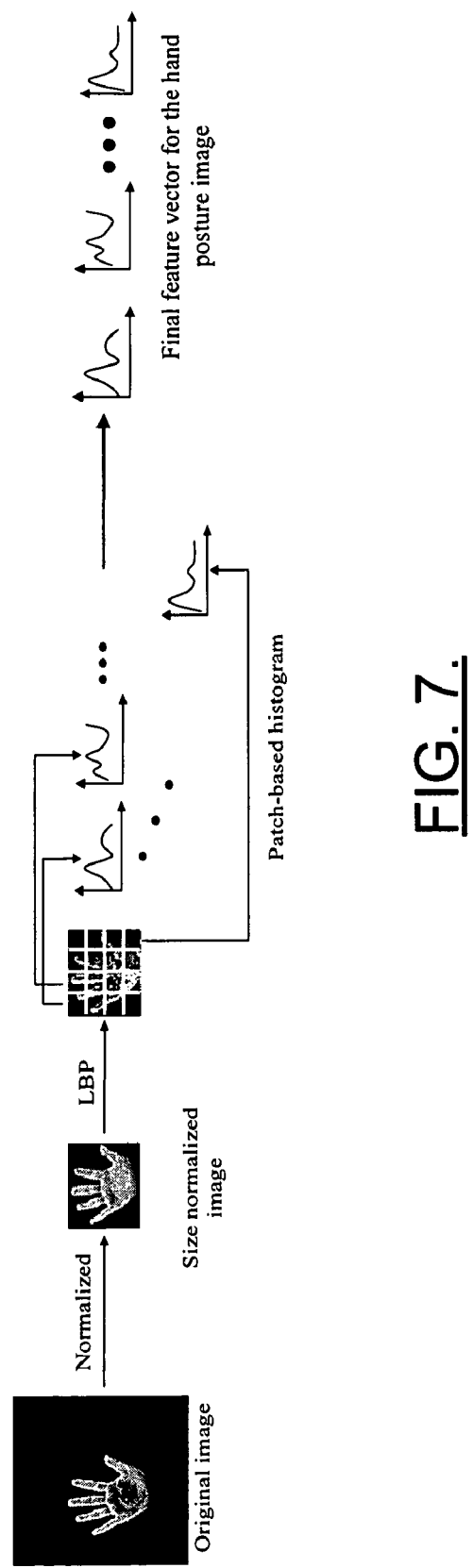
FIG. 7 illustrates an example of a sketch map of a patch-based local texture feature representation that may be produced by a gesture detector according to an exemplary embodiment of the present invention.

To apply the patch-based strategy, each LBP filtered image may be partitioned into patches or portions. Histograms may be counted within each local patch and a final feature vector may be formed by concatenating all the small histograms from each local patch. FIG. 7 illustrates an example of a sketch map of a patch-based local texture feature representation that may be produced by the gesture detector 80.

The skin region tracker 82 may, in an exemplary embodiment, be configured to track a user's hand. In order to enable gesture recognition with respect to a hand or other region of the body, accurate location of the hand or other region may improve the quality of analysis and the resulting output.

Based on the above described initialized hand location, hand tracking may be accomplished over consecutive frames by a detection-based strategy. In this regard, for example, skin detection may initially be accomplished using the skin model H that was generated above. Since the specific skin model H is generated, the hand region may be likely to be found by skin detection. Therefore, one pixel may be determined to be a skin point if the following conditions are satisfied:

$$H_{f(x,y)} > 0,$$

$$H_{f(x,y)} > \alpha \cdot \overline{H}_{f(x,y)}, 0 < \alpha < 1 \quad (5)$$

Figure 8:
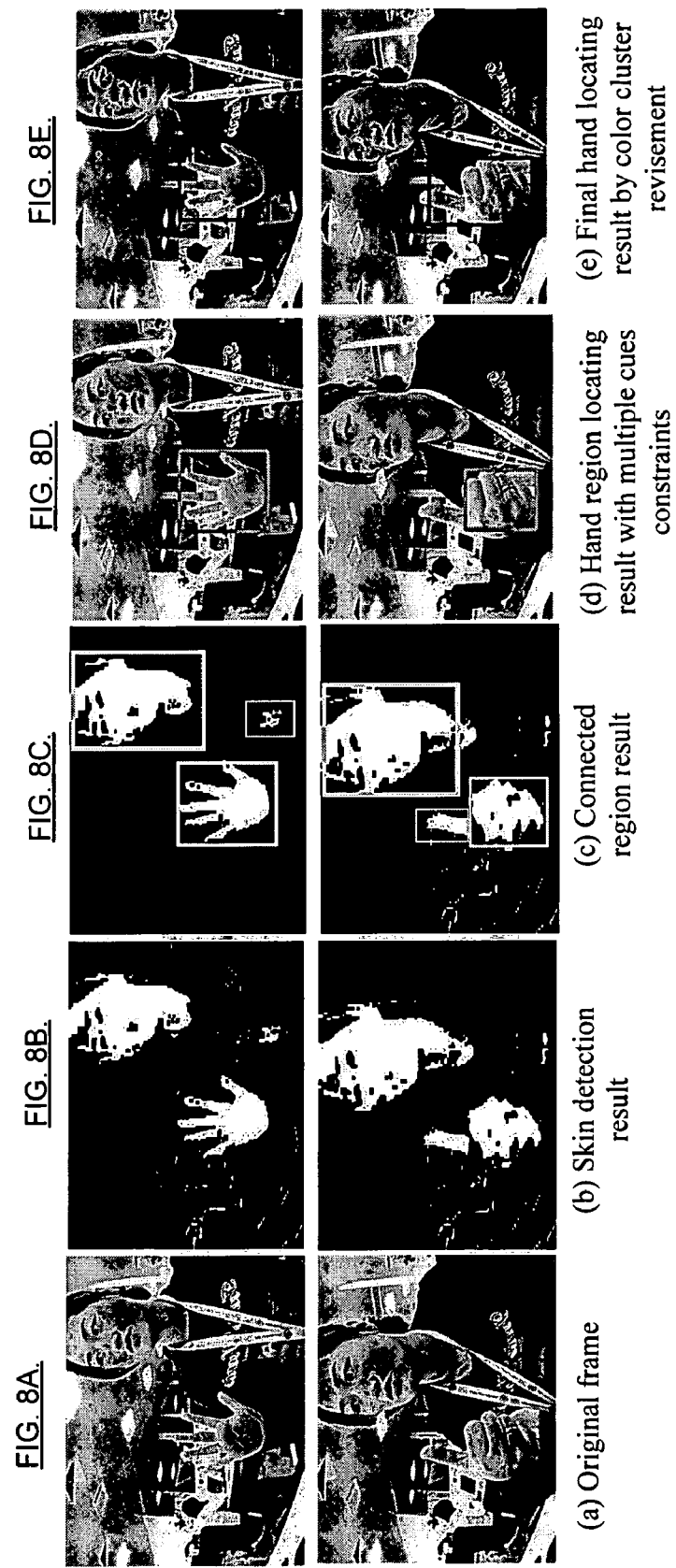
FIGS. 8A-8E illustrates examples of stages in a process of hand tracking according to an exemplary embodiment of the present invention.

After skin detection, some morphological operations may be employed, such as dilation and erosion, to reduce or eliminate noise. FIG. 8A shows two exemplary initial images (top and bottom, respectively) and FIGS. 8B through 8E show hand location and tracking operations for each respective initial image according to an exemplary embodiment. In this regard, examples of skin detection results are shown for each respective initial image in FIG. 8B.

Connected regions may then be erected or determined. In this regard, for example, based on the skin detection result, connected regions of skin pixels may be realized, which may correspond to a face, hand, or other object. Through the application of threshold constraints, smaller regions can be eliminated and larger skin regions may be maintained. In one exemplary embodiment, each connected region may be recorded as a rectangle with its center of mass C computed as:

$$C_i(x, y) = \left( \frac{\sum_j x_j}{n_i}, \frac{\sum_j y_j}{n_i} \right), \quad (6)$$

where, $(x_j,y_j)$ belongs to the i-th connected region, and $n_i$ is the total number of skin pixels in the region. However, any shape other than rectangular could alternatively be employed. FIG. 8C shows an example of a result of connected region determination according to an exemplary embodiment.

A connected region may correspond to not only a hand region, but also to a face region or a region related to another object. Accordingly, multiple cues may also be considered that may be used to differentiate different objects (e.g., differentiate a hand region from a face region). In an exemplary embodiment, if the face and hands are both detected by the user specific skin model, additional cues related to previous image frames may be used for assisting in differentiating objects.

In this regard, for example, face detection may be employed to assist in neglecting regions that may not be a region of interest (e.g., a hand region). As such, for example, any faces detected in each frame (and their respective connected regions) may be discarded. Additionally or alternatively, multiple frame analysis may be employed for hand tracking. As such, for example, the skin region tracker 82 may be configured to analyze consecutive video frames so that a hand location in a previous frame may be used as a cue to locate a new hand position in a current frame. Thus, for example, for remaining connected regions after the discarding of face regions, a connected region having a smallest distance to the hand region in the previous frame may be determined to be the hand region in current frame. The distance between two connected regions may be defined as the distance between the corresponding centers of the respective regions:

$$D(r_i, r_j) = \|C_i - C_j\|, \quad (7)$$

where $r_i$ and $r_j$ are two considered connected regions. $C_i$ and $C_j$ are their corresponding center of mass. FIG. 8D shows examples of hand region 90 determination results with multiple cues constraints employed.

In some embodiments, the skin region tracker 82 may be further configured to perform hand region determinations based on color consistency revision. In this regard, for example, based on the connected regions and the multiple cues constraints alone, the hand region may not be one single connected region (e.g., due to illumination effect). As a result, as shown in the lower image of FIG. 8D, a hand region may not be accurately defined. Accordingly, color consistency may also be analyzed by the skin region tracker 82 to revise a coarse hand location. One exemplary mechanism for including color consistency analysis may involve increasing the size of the region of interest to introduce additional analysis over a larger area that may include the actual whole hand. As an example, based on a current rectangular region r(w,h) of the hand, the region may be enlarged to be r'(2w,2h) while maintaining the center fixed. Color clustering may then be performed in the region r' to find a consistent color distribution. A skin cluster may then be determined by considering the corresponding skin portions to be a connected region. A largest connected region of skin cluster pixels may then be selected and a new center of the selected region may be determined. The selected region may include a better estimation of the hand region as shown in the bottom example in FIG. 8E.

The gesture recognizer 84 may be configured to perform gesture matching between features associated with a current region of interest and features of a region associated with a particular known gesture. For example, a database of known gestures and their respective features may be provided for comparison to features of a current gesture. If similarity between compared gestures is sufficient, the gesture recognizer 84 may associate a current gesture with the particular known gesture thereby identifying or recognizing the current gesture.

In an exemplary embodiment, the database of known gestures may be generated by the user (or by another) in an offline phase. Thus, multiple samples for each gesture may be collected to compose a gallery of gestures. In an exemplary embodiment, size normalization may initially be performed and each sample may be transformed into a feature vector according to the above described scheme and recorded as a template to be used for matching purposes.

To perform a recognition of hand gestures, a simple histogram intersection may be selected as a similarity measurement, and a nearest neighbor principle may be used to give a final recognition result. An example of such a similarity measure is described below. In this regard, for example, the similarity between two images ($I_1$ and $I_2$) may be defined in Eq. (8):

$$d(I_1, I_2) = \sum_{i=0}^{M \cdot Bin} \min(H_i^{I_1}, H_i^{I_2}) / (W \times H), \qquad (8)$$

where M is the total patch number and Bin is a category number classified as a gray value. W and H are the width and height of the normalized image, respectively. Comparing similarities between a current image and each template in the gallery, the final recognition result may be achieved according to the largest similarity:

$$\text{Identity} = \arg\max_j d(I_p, I_{G_j}), \qquad (9)$$

where, j ranges over the whole gallery. Based on the matching strategy, the gesture recognizer 84 may be configured to analyze the tracked hand region perform recognition on a frame by frame basis.

As indicated above, a recognized gesture may be utilized to trigger or cause execution of a particular command associated with the recognized gesture. In this regard, for example, the gesture recognizer 84 may communicate the identity of a recognized gesture to the processor 70, which may execute (e.g., via the user interface 72) a corresponding UI command. The command may be used to direct a UI system to execute a corresponding operation. However, some embodiments may provide for implementation of a voting strategy to ensure that gestures that may be encountered in a frame that corresponds to a transition period between intended gestures are not acted upon. For example, when transitioning between a thumb up gesture and a open hand gesture, an individual may first retract the thumb into what may appear to be a closed fist gesture. To avoid detection of the closed fist as a gesture to be acted upon with respect to issuing a UI system command, the voting manager 86 may be configured to count (e.g., on a frame or time basis) a number of times or length of time that a gesture appears. Thus, for example, a command may be regarded as a valid command only when the associated gesture appears n times continuously, where n is a predefined threshold. If a gesture does not meet criteria for validity, the recognition result may be ignored.

Figure 9:
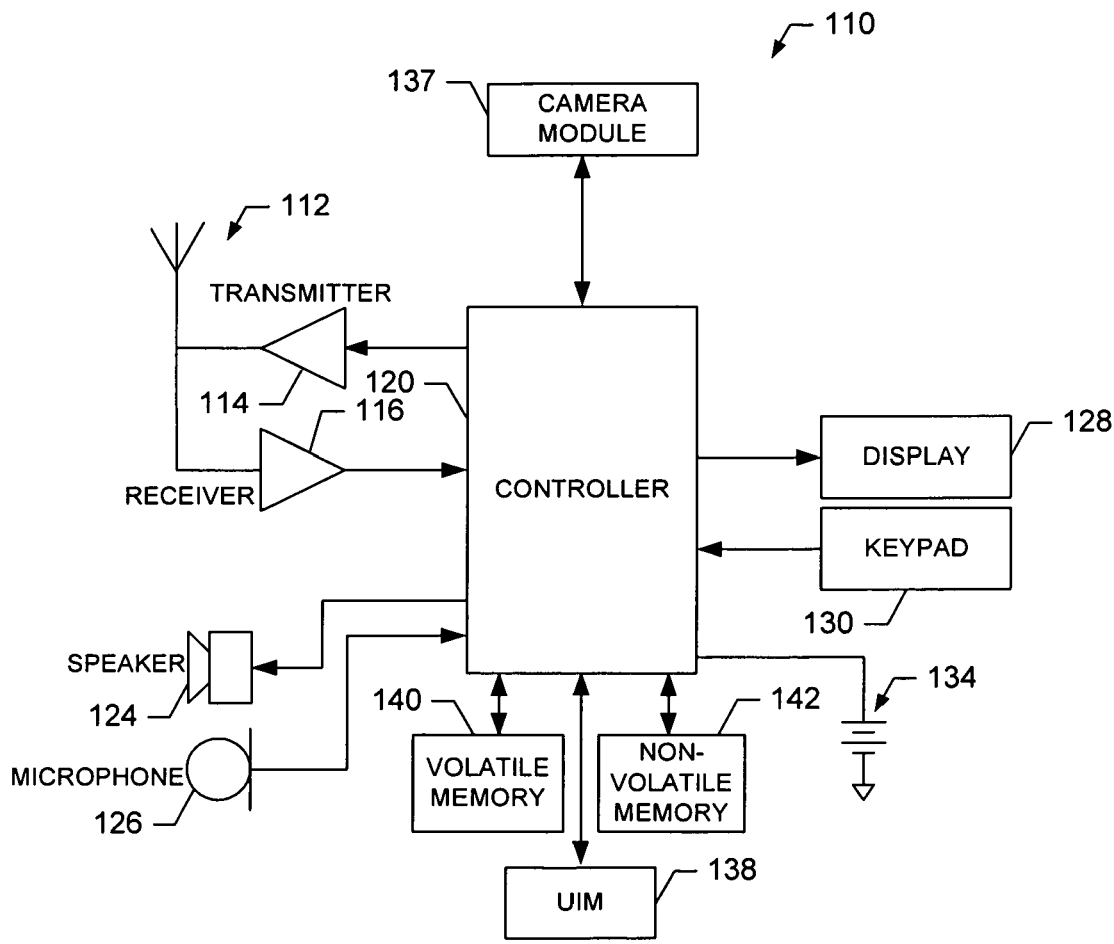
FIG. 9 illustrates a block diagram of a mobile terminal that may benefit from exemplary embodiments of the present invention.

An exemplary embodiment of the invention will now be described with reference to FIG. 9, in which certain elements of an apparatus for enabling gesture analysis are displayed. As such, FIG. 9 illustrates a block diagram of a mobile terminal 110 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In addition, while several embodiments of the method of the present invention may be performed or used by or in connection with a mobile terminal 110, the method may be employed by or used in connection with devices other than a mobile terminal (e.g., personal computers (PCs), servers, or the like). Moreover, the system and method of embodiments of the present invention may have been primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 110 may include an antenna 112 (or multiple antennas) in operable communication with a transmitter 114 and a receiver 116. The mobile terminal 110 may further include an apparatus, such as a controller 120 (e.g., processor 70) or other processing element, that provides signals to and receives signals from the transmitter 114 and receiver 116, respectively. The signals may include signaling information in accordance with the air interface standard of the applicable cellular system, and/or may also include data corresponding to speech, received data and/or user generated/transmitted data. In this regard, the mobile terminal 110 may be capable of operating with one or more air interface standards, communication protocols, modulation types, and access types. By way of illustration, the mobile terminal 110 may be capable of operating in accordance with any of a number of first, second, third and/or fourth-generation communication protocols or the like. For example, the mobile terminal 110 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 110 may be capable of operating in accordance with non-cellular communication mechanisms. For example, the mobile terminal 110 may be capable of communication in a wireless local area network (WLAN) or other communication networks.

It is understood that the apparatus, such as the controller 120, may include circuitry for implementing, among others, audio/video and logic functions of the mobile terminal 110. For example, the controller 120 may comprise a digital signal processor device, a microprocessor device, and various analog to digital converters, digital to analog converters, and/or other support circuits. Control and signal processing functions of the mobile terminal 110 may be allocated between these devices according to their respective capabilities. The controller 120 thus may also include the functionality to encode and interleave message and data prior to modulation and transmission. The controller 120 may additionally include an internal voice coder, and may include an internal data modem. Further, the controller 120 may include functionality to operate one or more software programs, which may be stored in memory. For example, the controller 120 may be capable of operating a connectivity program, such as a conventional web browser. The connectivity program may then allow the mobile terminal 110 to transmit and receive web content, such as location-based content and/or other web page content, according to a Wireless Application Protocol (WAP), Hypertext Transfer Protocol (HTTP) and/or the like, for example.

The mobile terminal 110 may also comprise a user interface including an output device such as an earphone or speaker 124, a microphone 126, a display 128, and a user input interface, which may be operationally coupled to the controller 120. The user input interface, which allows the mobile terminal 110 to receive data, may include any of a number of devices allowing the mobile terminal 110 to receive data, such as a keypad 130, a touch display (not shown) or other input device. In embodiments including the keypad 130, the keypad 130 may include numeric (0-9) and related keys (#, *), and other hard and soft keys used for operating the mobile terminal 110. Alternatively, the keypad 130 may include a QWERTY keypad arrangement. The keypad 130 may also include various soft keys with associated functions. In addition, or alternatively, the mobile terminal 110 may include an interface device such as a joystick or other user input interface. The mobile terminal 110 further includes a battery 134, such as a vibrating battery pack, for powering various circuits that are used to operate the mobile terminal 110, as well as optionally providing mechanical vibration as a detectable output.

The mobile terminal 110 may further include a user identity module (UIM) 138. The UIM 138 is typically a memory device having a processor built in. The UIM 138 may include, for example, a subscriber identity module (SIM), a universal integrated circuit card (UICC), a universal subscriber identity module (USIM), a removable user identity module (R-UIM), etc. The UIM 138 typically stores information elements related to a mobile subscriber. In addition to the UIM 138, the mobile terminal 110 may be equipped with memory. The mobile terminal 10 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 140 non-volatile memory 142 may include a cache area for temporary storage of data. The memories can store any of a number of pieces of information, and data, used by the mobile terminal 110 to implement the functions of the mobile terminal 110. For example, the memories can include an identifier, such as an international mobile equipment identification (IMEI) code, capable of uniquely identifying the mobile terminal 110. Furthermore, the memories may store instructions for determining cell id information. Specifically, the memories may store an application program for execution by the controller 120, which determines an identity of the current cell, i.e., cell id identity or cell id information, with which the mobile terminal 110 is in communication.

In an exemplary embodiment, the mobile terminal 110 may include a media capturing module, such as a camera, video and/or audio module, in communication with the controller 120. The media capturing module may be any means for capturing an image, video and/or audio for storage, display or transmission. For example, in an exemplary embodiment in which the media capturing module is a camera module 137, the camera module 137 may include a digital camera capable of forming a digital image file from a captured image. As such, the camera module 137 may include all hardware, such as a lens or other optical device, and software necessary for creating a digital image file from a captured image. Alternatively, the camera module 137 may include only the hardware needed to view an image, while a memory device of the mobile terminal 110 stores instructions for execution by the controller 120 in the form of software necessary to create a digital image file from a captured image. In an exemplary embodiment, the camera module 137 may further include a processing element such as a co-processor which assists the controller 120 in processing image data and an encoder and/or decoder for compressing and/or decompressing image data. The encoder and/or decoder may encode and/or decode according to a JPEG (Joint Photographic Experts Group) standard format or other formats.

Figure 10:
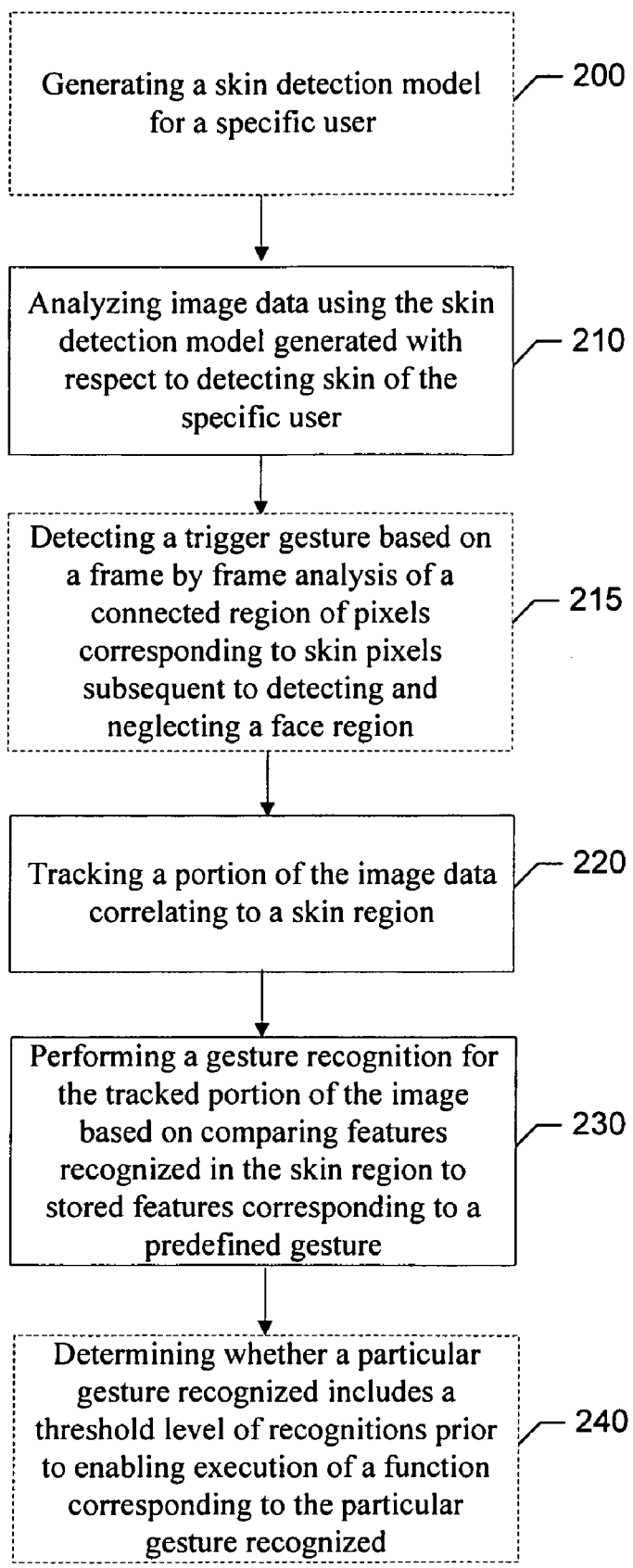
FIG. 10 is a flowchart according to an exemplary method for providing gesture analysis according to an exemplary embodiment of the present invention.

FIG. 10 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing gesture analysis as illustrated, for example, in FIG. 10 may include analyzing image data using a skin detection model generated with respect to detecting skin of a specific user 210. The method may further include tracking a portion of the image data correlating to a skin region at operation 220 and performing gesture recognition for the tracked portion of the image based on comparing features recognized in the skin region to stored features corresponding to a predefined gesture at operation 230. The skin region may correspond to a hand region in some cases.

In an exemplary embodiment, the method may include further optional operations as well, some examples of which are shown in FIG. 10 in dashed lines. In this regard, exemplary additional operations may include operation 200 which may be an initial operation of generating the skin detection model for the specific user. However, the skin detection model may be previously developed and thus need not be performed in some embodiments. In some embodiments, generating the skin detection model may include utilizing a color histogram model to generate the skin model.

In another exemplary embodiment, performing the gesture recognition may include initiating recognition of gestures in response to detection of a trigger gesture. In such a situation, the method may further include detecting the trigger gesture based on a frame by frame analysis of a connected region of pixels corresponding to skin pixels subsequent to detecting and neglecting a face region at operation 215. In some embodiments, the method may further include determining whether a particular gesture recognized includes a threshold level of recognitions (e.g., in terms of number of recognitions, number of frames, or number of recognitions or frames over a given time period) prior to enabling execution of a function corresponding to the particular gesture recognized at operation 240.

In an exemplary embodiment, tracking the portion of the image may include initiating tracking motion of the skin region in response to detection of a trigger gesture. Alternatively or additionally, tracking the portion of the image may include determining a hand region in the image data based at least in part on hand location in a previous frame or expanding boundaries of the region and determining a skin cluster within the expanded boundaries to correspond to a hand portion for use in gesture recognition. In another exemplary embodiment, performing gesture recognition may include comparing a patch-based local texture descriptor for the portion (e.g., hand portion) of the image to a plurality of predefined samples.

In an exemplary embodiment, an apparatus for performing the method of FIG. 10 above may comprise a processor (e.g., the processor 70) configured to perform some or each of the operations (200-240) described above. The processor may, for example, be configured to perform the operations (200-240) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-240 may comprise, for example, the processor 70, respective ones of the skin model generator 78, the gesture detector 80, the skin region tracker 82, the gesture recognizer 84 and the voting manager 86, or an algorithm executed by the processor for controlling the skin model generation, gesture recognition, hand tracking and voting as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   analyzing image data using a skin detection model generated with respect to detecting skin of a specific user;
   tracking a portion of the image data correlating to a skin region; and
   performing a gesture recognition for the tracked portion of the image based on comparing a patch-based local texture descriptor of features recognized in the skin region to stored features corresponding to a predefined gesture.

2. The method of claim 1, further comprising generating the skin detection model for the specific user prior to analyzing image data.

3. The method of claim 2, wherein generating the skin detection model comprises utilizing a color histogram model to generate the skin model.

4. The method of claim 1, wherein tracking the portion of the image comprises initiating tracking motion of the skin region in response to generation of the skin detection model.

5. The method of claim 1, wherein performing the gesture recognition comprises initiating recognition of gestures in response to detection of a trigger gesture.

6. The method of claim 5, further comprising detecting the trigger gesture based on a frame by frame analysis of a connected region of pixels corresponding to skin pixels subsequent to detecting and neglecting a face region.

7. The method of claim 1, wherein tracking the portion of the image comprises determining a hand region in the image data based at least in part on hand location in a previous frame.

8. The method of claim 1, wherein tracking the portion of the image comprises expanding boundaries of the region and determining a skin cluster within the expanded boundaries to correspond to a hand portion for use in gesture recognition.

9. The method of claim 1, wherein performing gesture recognition comprises comparing the patch-based local texture descriptor for the portion of the image to a plurality of predefined samples.

10. The method of claim 1, further comprising determining whether a particular gesture recognized includes a threshold level of recognitions prior to enabling execution of a function corresponding to the particular gesture recognized.

11. An apparatus comprising:
a processor; and
a memory including computer program code, the memory and the computer program code configured to, with the processor, cause the apparatus to at least:
analyze image data using a skin detection model generated with respect to detecting skin of a specific user;
track a portion of the image data correlating to a skin region; and
perform a gesture recognition for the tracked portion of the image based on comparing a patch-based local texture descriptor of features recognized in the skin region to stored features corresponding to a predefined gesture.

12. The apparatus of claim 11, wherein the memory including the computer program code is further configured to, with the processor, cause the apparatus to perform generating the skin detection model for the specific user prior to analyzing image data.

13. The apparatus of claim 12, wherein the memory including the computer program code is further configured to, with the processor, cause the apparatus to generate the skin detection model by utilizing a color histogram model to generate the skin model.

14. The apparatus of claim 11, wherein the memory including the computer program code is further configured to, with the processor, cause the apparatus to track the portion of the image by initiating tracking motion of the skin region in response to generation of the skin detection model.

15. The apparatus of claim 11, wherein the memory including the computer program code is further configured to, with the processor, cause the apparatus to perform the gesture recognition by initiating recognition of gestures in response to detection of a trigger gesture.

16. The apparatus of claim 15, wherein the memory including the computer program code is further configured to with the processor, cause the apparatus to detect the trigger gesture based on a frame by frame analysis of a connected region of pixels corresponding to skin pixels subsequent to detecting and neglecting a face region.

17. The apparatus of claim 11, wherein the memory including the computer program code is further configured to, with the processor, cause the apparatus to track the portion of the image by determining a hand region in the image data based at least in part on hand location in a previous frame.

18. The apparatus of claim 11, wherein the memory including the computer program code is further configured to with the processor, cause the apparatus to track the portion of the image by expanding boundaries of the region and determining a skin cluster within the expanded boundaries to correspond to a hand portion for use in gesture recognition.

19. The apparatus of claim 11, wherein the memory including the computer program code is further configured to, with the processor, cause the apparatus to perform gesture recognition by comparing the patch-based local texture descriptor for the portion of the image to a plurality of predefined samples.

20. The apparatus of claim 11, wherein the memory including the computer program code is further configured to, with the processor, cause the apparatus to determine whether a particular gesture recognized includes a threshold level of recognitions prior to enabling execution of a function corresponding to the particular gesture recognized.

21. A computer program product comprising at least one computer-readable non-transitory storage medium having computer-executable program code instructions stored therein, the computer-executable program code instructions comprising:
first program code instructions for analyzing image data using a skin detection model generated with respect to detecting skin of a specific user;
second program code instructions for tracking a portion of the image data correlating to a skin region; and
third program code instructions for performing a gesture recognition for the tracked portion of the image based on comparing a patch-based local texture descriptor of features recognized in the skin region to stored features corresponding to a predefined gesture.

22. The computer program product of claim 21, further comprising fourth program code instructions for generating the skin detection model for the specific user prior to analyzing image data.

23. The computer program product of claim 22, wherein the fourth program code instructions include instructions for utilizing a color histogram model to generate the skin model.

24. The computer program product of claim 21, wherein the second program code instructions include instructions for initiating tracking motion of the skin region in response to generation of the skin detection model.

25. The computer program product of claim 21, wherein the third program code instructions include instructions for initiating recognition of gestures in response to detection of a trigger gesture.

26. The computer program product of claim 25, further comprising fourth program code instructions for detecting the trigger gesture based on a frame by frame analysis of a connected region of pixels corresponding to skin pixels subsequent to detecting and neglecting a face region.

27. The computer program product of claim 21, wherein the second program code instructions include instructions for determining a hand region in the image data based at least in part on hand location in a previous frame.

28. The computer program product of claim 21, wherein the second program code instructions include instructions for expanding boundaries of the region and determining a skin cluster within the expanded boundaries to correspond to a hand portion for use in gesture recognition.

29. The computer program product of claim 21, wherein the third program code instructions include instructions for comparing the patch-based local texture descriptor for the portion of the image to a plurality of predefined samples.

30. The computer program product of claim 21, further comprising fourth program code instructions for determining whether a particular gesture recognized includes a threshold level of recognitions prior to enabling execution of a function corresponding to the particular gesture recognized.

31. An apparatus comprising:
means for analyzing image data using a skin detection model generated with respect to detecting skin of a specific user;
means for tracking a portion of the image data correlating to a skin region; and
means for performing a gesture recognition for the tracked portion of the image based on comparing a patch-based local texture descriptor of features recognized in the skin region to stored features corresponding to a predefined gesture.

32. The apparatus of claim 31, further comprising means for generating the skin detection model for the specific user prior to analyzing image data.

* * * * *